United States Patent Office 3,155,637
Patented Nov. 3, 1964

3,155,637
PROCESS FOR THE PRODUCTION OF EXTREMELY HIGH MOLECULAR WEIGHT POLYAMIDES
Ernst Reichold, Krefeld, Günter Jacobs, Krefeld-Bockum, and Walter Böckmann, Krefeld-Uerdingen, Germany, assignors to Farbenfabriken Bayer Aktiengesellschaft, Leverkusen, Germany, a corporation of Germany
No Drawing. Filed June 2, 1960, Ser. No. 33,367
Claims priority, application Germany June 16, 1959
7 Claims. (Cl. 260—78)

The present invention is concerned with a process for the production of polyamides derived from ε-amino capronic acid (also known as epsilon-aminocaproic acid, omega-aminocaproic acid, and 6-aminohexanoic acid) of extremely high molecular weight containing a small amount of extractable, low molecular weight constituents.

Polyamides derived from ε-amino capronic acid in the meaning of this invention are produced from ε-amino capronic acid or from ε-caprolactam alone or in admixture with other polyamide-forming ingredients, such as equimolar ratios of polyamide-forming diamines and dicarboxylic acids for example, hexamethylene diamine and adipic or sebacic acid, whereby the content of ε-amino capronic acid or caprolactam amounts to at least about 10 mol percent.

Such polyamides are produced by heating a molten mixture of the polyamide-forming components, generally to temperatures in the range of about 200–300° C. in an inert atmosphere. Depending upon the reaction temperature an equilibrium is established between the high molecular weight polyamide of ε-amino capronic acid and the extractable, low molecular weight constituents. The higher the reaction temperature, the higher is the content of such low molecular weight constituents. In general, the content of low molecular weight constituents amounts—according to the amount of ε-amino capronic acid or of caprolactam in the starting mixture—from between about 1 and about 10 percent by weight, if the polyamides are produced in the usual manner mentioned above.

For many purposes it is desirable to produce polyamides derived from ε-amino capronic acid as described herein which have an extremely high molecular weight and containing an especially small proportions of extractable, low molecular weight constituents.

It is known to produce especially high molecular weight polyamides derived from ε-amino capronic acid containing a small amount of extractable, low molecular weight constituents which are particularly suitable for use in the field of synthetic plastics, by a process according to which polyamide-forming starting materials are converted in the molten state in the presence of materials promoting polycondensation or polymerization, for example, mineral acids, such as phosphoric acid, into products which do not have a very high viscosity. The melts, preferably while moulding to bodies of large surface area such as foils and granules, are solidified by cooling and these bodies heated in this form for a long period of time at temperatures above about 150° C., but below the softening point, under reduced pressure or in a stream of dry inert gas. In this manner, the content of extractable, low molecular weight constituents of the intermediate product, which corresponds approximately to the equilibrium produced at the reaction temperature of the first process step, is reduced if it has not already been reduced, for example, by application of suction to the melt, or expelling them from the melt by forcing a stream of inert gas therethrough, or by leaching the granules. Furthermore, the average molecular weight or degree of polymerization of the products is more or less increased.

The content of the polymerization-promoting materials of the type such as the above mentioned mineral acids in the polyamides, results in the production of polyamides which are not very thermostable, i.e., by further heating to higher temperatures some decomposition takes place. Therefore, such catalysts are only used in special cases. Usually, other additives, such as aminocarboxylic acids, salts of diamines and dicarboxylic acids, or even water, are used. If intermediate products produced in the melt in the usual manner with the help of such additional materials, which are non-viscosity stabilized, with a correspondingly high content of extractable, low molecular weight constituents which are then subsequently further heated to temperatures below the softening point in a vacuum or in a dry inert atmosphere, then the content of extractable, low molecular weight constituents certainly drops, but the average degree of polymerization no longer increases markedly above a definite limit which corresponds to a relative viscosity of about 4 measured in 1 percent cresol solution at 20° C.

A known process consisting in freeing such intermediate products from low molecular weight compounds by washing with organic solvents or water before the subsequent heating, in known manner, thereby producing products having a high average molecular weight and a low content of extractable, low molecular weight constituents. However, this process involves the disadvantage that the leaching of the low molecular weight constituents is time consuming and is bound up with a considerable expenditure of extraction agents, and the remainder of which must subsequently be removed from the product.

We have now surprisingly found that polyamides derived from ε-amino capronic acid as above defined, having extremely high molecular weight which corresponds to a relative viscosity measured in 1 percent cresol solution at 20° C. of at least about 4.5 and with an amount of extractable, low molecular weight constituents less than about 0.7 percent by weight can be obtained in a particularly technically advantageous manner by heating non-viscosity stabilized polyamides of the type having a molecular weight corresponding to a relative viscosity of at most about 3.0 measured in 1 percent cresol solution at 20° C. with an amount of extractable, low molecular weight constituents of at least about 1 percent by weight to temperatures above about 150° C. but below the softening point, that is to say in the solid phase, in a stream of superheated steam, optionally together with an inert gas.

The degree of superheating of the steam can vary within wide limits. Good results are obtained, for example, by the use of nitrogen heated to 180–200° C. which has been saturated with water at room temperature or at elevated temperatures of, for example, 20–100° C.

In contradistinction to all previously known methods, according to the present invention intermediate products rich in extractable, low molecular weight constituents which contain no special catalysts, such as the mineral acids of the above-mentioned known processes are subsequently heated in an atmosphere containing water without previously washing out the low molecular weight constituents. In this manner, it is possible to reduce the content of extractable, low molecular weight constituents to less than about 0.7 percent by weight by, for example, heating the intermediate product for 24 to 100 hours at temperatures of 180–200° C. and, at the same time, to achieve products with relative viscosities of about 4.5 and more measured in 1 percent cresol solution at 20° C.

It is frequently expedient to dry, in known manner, the polyamides produced according to the invention before their further working-up, optionally, for example, by a short treatment at elevated temperatures under a vacuum or with dry inert gases.

As inert gases nitrogen and carbon dioxide are generally preferred.

When carrying out the process on a technical scale, it may be expedient to circulate the inert gas in order to remove the low molecular weight constituents therefrom.

The following examples are given for the purpose of illustrating the present invention.

*Example 1*

A polyamide in the form of granules, produced in known manner by heating ε-caprolactam with a small addition of water to 260–280° C., spinning the melt into a filament or wire and cutting or chopping it to pieces having a relative viscosity of 2.8 (1 percent solution in cresol) and containing 10.6 percent by weight of extractable low molecular weight constituents, is treated at 195° C. with a stream of hot nitrogen (200 liters per hour per kilogram of polyamide granules) which has been saturated with water vapor at 20–30° C. After 24 hours, the relative viscosity is 4.12, the extractable portion amounts to 0.5 percent, after 48 hours the corresponding values are 4.70 and 0.4 percent, after 72 hours 5.65 and 0.32 percent, and after 75 hours 5.72 and 0.24 percent.

*Example 2*

A polycaprolactam in the form of granules having a relative viscosity of 2.89 (1 percent solution in cresol) and containing 9.5 percent by weight of extractable low molecular weight constituents is treated in the manner described in Example 1 but with the use of a stream of nitrogen which has been saturated with water vapor at 50° C. After 24 hours, the relative viscosity is 4.92 and the extractable portion amounts to 0.50 percent. After 48 and 72 hours the resultant values are 5.86 and 0.45 percent, and 6.55 and 0.28 percent, respectively.

We claim:
1. A process for the production of extremely high molecular weight polyamides of epsilon-aminocaproic acid having a relative viscosity based upon the viscosity of a 1 percent solution thereof in cresol at a temperature of 20° C. of at least about 4.5 and containing at most about 0.7 percent by weight of low molecular constituents that are extractable by organic solvents which comprises heating an unstabilized polyamide of epsilon-aminocaproic acid having a relative viscosity based upon the viscosity of a 1 percent solution thereof in cresol at a temperature of 20° C. of less than about 3.0 and containing at least about 1 percent by weight of low molecular weight constituents that are extractable by organic solvents to a temperature above about 150° C. but below the softening point of the polyamide in a stream of a gas of the group consisting of superheated steam and mixtures of inert gases and superheated steam.

2. A process as defined in claim 1 in which the product is subsequently dried after the desired degree of polymerization has been reached.

3. A process as defined in claim 1 in which the stream of gas that is used is a mixture of superheated steam and an inert gas.

4. A process as defined in claim 1 in which the stream of gas that is used is nitrogen saturated with water vapor at a temperature between 20 and 100° C.

5. A process as defined in claim 1 in which the unstabilized polyamide of epsilon-aminocaproic acid which is heated has a relative viscosity of 2.8 based upon the viscosity of a 1 percent solution thereof in cresol at a temperature of 20° C.

6. A process as defined in claim 1 in which the unstabilized polyamide of epsilon-aminocaproic acid which is heated has a relative viscosity of 2.89 based upon the viscosity of a 1 percent solution thereof in cresol at a temperature of 20° C.

7. A process as defined in claim 1 in which the unstabilized polyamide of epsilon-aminocaproic acid is heated at a temperature between 180 and 200° C. for a period between 24 and 100 hours.

References Cited in the file of this patent
UNITED STATES PATENTS

| | | |
|---|---|---|
| 2,163,636 | Spanagel | June 27, 1939 |
| 2,241,322 | Hanford | May 6, 1941 |
| 2,345,533 | Graves | Mar. 28, 1944 |
| 2,562,796 | Koch | July 31, 1951 |
| 2,731,081 | Mayner | Jan. 17, 1956 |
| 2,867,805 | Ludewig | Jan. 6, 1959 |
| 2,993,879 | Gabler et al. | July 25, 1961 |
| 3,109,835 | Apostle et al. | Nov. 5, 1963 |